Figure 1:
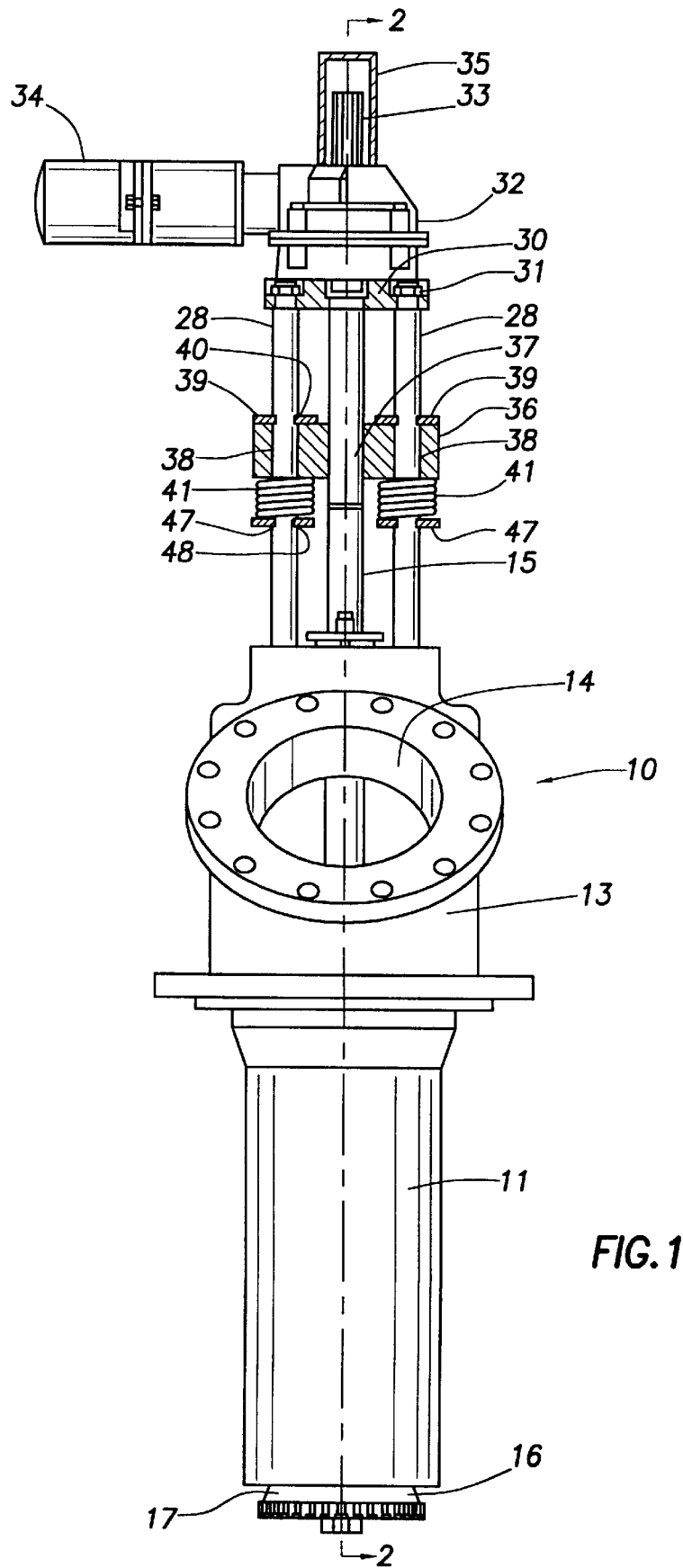

United States Patent [19]
Wright

[11] Patent Number: 6,119,716
[45] Date of Patent: Sep. 19, 2000

[54] VALVE

[75] Inventor: Nigel Wright, Cambewarra, Australia

[73] Assignee: Keystone Pacific Pty., Ltd., Nowra, Australia

[21] Appl. No.: 09/096,119

[22] Filed: Jun. 11, 1998

[30] Foreign Application Priority Data

Jun. 11, 1997 [AU] Australia ................................ 24805/97

[51] Int. Cl.[7] ................................................. F16K 29/00
[52] U.S. Cl. ........................................ 137/331; 137/243.6
[58] Field of Search .................................... 137/331, 330, 137/242, 243.6, 243

[56] References Cited

U.S. PATENT DOCUMENTS

| | | | |
|---|---|---|---|
| 3,717,133 | 2/1973 | Enke et al. | 137/331 |
| 4,094,280 | 6/1978 | Updike | 137/331 |
| 4,338,961 | 7/1982 | Karpenko | 137/243.3 |
| 4,346,728 | 8/1982 | Sulzer | 137/243.6 |
| 4,460,009 | 7/1984 | Nanci et al. | 137/243.6 |
| 4,465,091 | 8/1984 | Keller | 137/243.6 |

*Primary Examiner*—Gregory L. Huson
*Assistant Examiner*—Joanne Y. Kim
*Attorney, Agent, or Firm*—Browning Bushman

[57] ABSTRACT

A valve comprising a valve housing (10), having a valve seat (18) therein, a valve member (16) moveable via a valve spindle (15) between positions spaced from and seated on the valve seat. The valve member is required to lap a plurality of times on the valve seat to compensate for any variation of tolerance between the valve member and the valve seat resulting from build up of medium or erosion. The valve spindle extends outwardly from the valve housing and a pair of pillars (28) extend from the valve housing to a bridge member (30) whilst the collar (36) in threadable engagement with the valve spindle extends to and surrounds the pillars to be axially moveable relative thereto. Belleville washers (41) are provided between the underside of the collar and washers (47) forming abutments carried by the pillars. The Belleville washers compensate for relative movement between the valve spindle and the valve housing during lapping action of the valve member on the valve seat. Additional pillars (28) extend between the bridge member (30) and the valve housing (10) and the bridge member carries a hydraulic motor (34) to rotate the valve spindle (15) via a bevel gear box mechanism 32.

20 Claims, 2 Drawing Sheets

VALVE

This invention relates to a valve, and more particularly a valve for use in controlling the flow of fluid or semi-fluid medium where the medium is very erosive and can also harden or set to foul the seating of a valve closure member on an associated valve seat.

The valve of the present invention has been developed particularly for use in the alumina industry, where the flow of alumina medium through a plant in to be controlled by opening and closing of the valve.

It is an object of the present invention to provide a valve which ensures maximum life of the valve as erosion occurs whereby the tolerance between the mating surfaces of the valve member and the associated valve seat varies, and for which compensation is required during prolonged use of the valve.

In accordance with the present invention there is envisaged a valve comprising a valve housing having a valve seat therein, a valve member moveable via a valve spindle between positions spaced from and seated on the valve seat, wherein said valve member is required to lap at least once on said valve seat to compensate for any variation of tolerance between said valve member and said valve seat resulting from build up of medium or erosion, wherein said valve spindle extends outwardly of said valve housing and means are provided between the valve spindle outwardly of said housing and said valve housing itself to compensate for relative movement therebetween during said lapping action of said valve member on said valve seat.

Preferably at least two pillars are provided extending between said housing and an outer end of said valve spindle and parallel thereto, whilst a collar is provided surrounding said valve spindle in threadible engagement therewith and extending to, and surrounding, said pillars such as to be axially movable relative thereto, whilst compressible mans are provided between the underside of said collar and underlying abutment means on said pillars to provide said means to compensate for relative movement between said valve spindle and said valve body during said lapping action.

Figure 2:
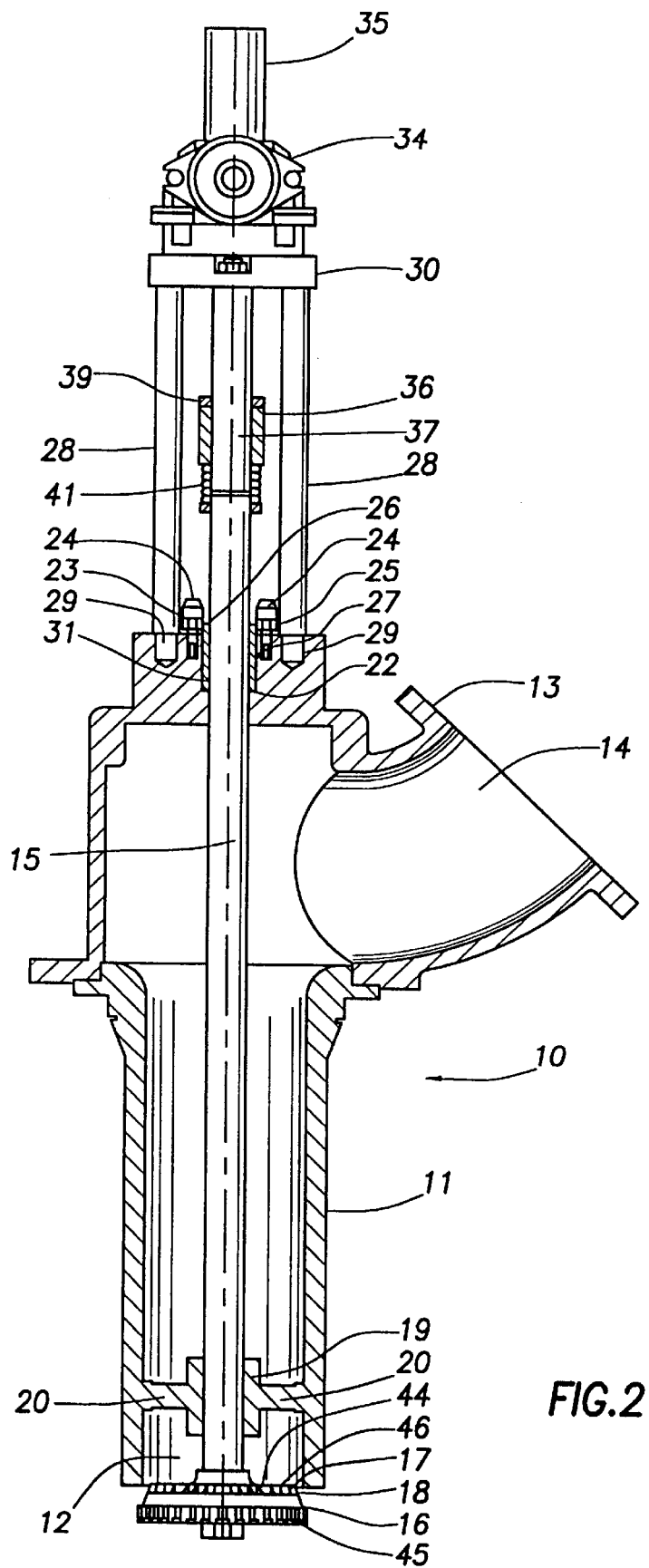

One preferred embodiment of the invention will now be described with reference to the accompanying drawings, in which;

FIG. 1 is a side elevational view, partly sectioned, of the valve of this preferred embodiment of the invention, and FIG. 2 is a cross-sectional view taken along line 2—2 of FIG. 1.

The valve of this preferred embodiment of the invention has a valve housing generally indicated as 10, comprised of a lower valve housing section 11 having an inlet port 12, and an upper valve housing section 13 having a side outlet port 14.

An axially moveable valve spindle 15 extends axially through the valve housing and carries at its lower end a valve member 16 having a frusto-conical valve member surface 17 adapted to be moved axially into and out of sealing engagement with a correspondingly conically shaped valve seat 18 formed in the end of the lower valve housing section 11. A guide collar 19 surrounds the lower end of the valve spindle and is spaced from the inside of the lower valve housing section by a plurality of spokes 20. The valve controls flow of fluid or semi-fluid medium from the inlet port 12 past the spokes 20 and through the lower valve housing section 11 into the upper valve housing section 12 and thereafter outwardly through the side outlet port 14.

A gland packing 21 is retained in an annular groove 22 in the upper end of the upper valve housing section 12, and in close sealing engagement with the circumference of the valve spindle, whilst being retained in position by a gland follower 23 and a pair of gland nuts 24 extending through holes 25 in a gland follower flange 26 and into threaded holes 27 in the top of the upper valve housing section 12.

The valve spindle extends outwardly from the upper valve housing section 12 and is surrounded by, in this case four, circumferentially spaced pillars 28, the lower ends of which are screw threaded at 29 into the top of the upper valve housing section 12, and such as to extend parallel to the valve spindle to a bridge member 30 to be attached thereto by bolted connections 31 and through which the upper end of the valve spindle extends. A bevel gear box mechanism 32 is mounted on the bridge member 30, with an axially upper section 33 of the valve spindle extending therethrough, and forming part of the gear mechanism of the gear box, with the remainder of the gear mechanism being rotatably driven by a hydraulic motor 34. The upper end of the upper section 33 of the valve spindle is encased in a spindle cover 35.

A collar or spindle nut 36 is provided between the upper end of the upper housing body section 12 and the bridge member 30 to extend away from either side of the valve spindle and is threadably engaged therewith at 37, and also has holes 38 therethrough at either end and through which two of the pillars 28 extend and such as the collar or nut 36 will be axially moveable relative thereto during part of the actuation of the valve.

The upper side of the collar or spindle nut 36 is restrained against axially upward movement relative to the two pillars 28 by upper pillar washers 39 trapped within grooves 40 extending circumferentially around the pillars 28, whilst the underside of the collar or spindle nut bears against belleville washers 41, or equivalent compressible means, surrounding each of the pillars and trapped between the underside of the collar or spindle nut 36 and lower pillar washers 47 engaging On ledges or within grooves 48, formed circumferentially around the pillars 28.

During actuation of the valve, to axially draw the valve member surface 17 of the valve member 16 up into sealing engagement with the valve seat 18, the valve spindle 15 is rotated by the hydraulic motor 34, via the bevel gear box 32, and due to the threaded interaction between the valve spindle 15 and the collar or spindle nut 36, the latter being restrained against upward movement by the upper pillar washers 39, and until such time as the valve member surface 17 contacts the valve sent 18, whereafter the valve member surface laps the valve seat 18, for example up to four times. The ensuing axial movement of the valve spindle is compensated or accommodated by the collar or spindle nut 36 being driven axially downward by the valve spindle and also freely axially down the pillars 28 with which it is associated, and simultaneously compressing the belleville washers 40 against the underlying lower pillar washers 41.

In this preferred embodiment of the invention, the circumferential edge of the valve member 16 below the frusto-conical valve member surface 17, and a further conical section 44 above the valve member surface 17, have serrations 45 and 46 respectively formed thereon, which assist in grinding away any medium which may have hardened or became set on the valve member 16 and/or the valve seat 18.

The claims defining the invention are as follows:

1. A valve, comprising:
    a valve housing having a flow path and a valve seat therein;
    a valve member moveable by rotation of a valve spindle between positions spaced from and seated on the valve seat;

a control mechanism for moving the valve spindle axially for engagement with the valve seat and, when the valve member is adjacent the valve seat, for rotating the valve spindle and valve member without axially moving the valve member, such that the valve member laps the valve seat to compensate for any variation of tolerance between the valve member and the valve seat resulting from buildup of medium or erosion; and the control mechanism including a collar for threaded engagement with the valve spindle and one or more springs for enabling rotary movement of the spindle and valve member during axially movement of the collar with respect to the valve body.

2. The valve as defined in claim 1, further comprising:

said valve spindle extending outwardly from the valve housing; and the control mechanism being positioned outwardly of the valve housing.

3. The valve as defined in claim 1, further comprising:

at least two pillars affixed to the valve housing and extending outwardly therefrom, each pillar having a pillar axis parallel to a spindle axis.

4. The valve as defined in claim 3, further comprising:

a bridge member for interconnecting outer ends of the at least two pillars.

5. A valve as defined in claim 4, wherein the valve actuator is positioned opposite the valve body with respect to the bridge member.

6. The valve as defined in claim 3, further comprising:

the springs circumferentially surround the at least two pillars.

7. The valve as defined in claim 1, wherein the springs are positioned between the collar and the valve housing.

8. The valve as defined in claim 7, wherein the springs comprise belleville washers.

9. The valve as defined in claim 1, wherein the valve actuator is a hydraulic motor and a gear box.

10. The valve as defined in claim 1, further comprising:

the valve member including serrations thereon for removing medium from at least one of the valve member and valve seat.

11. The valve as defined in claim 1, further comprising:

the valve seat in the valve housing being downwardly facing; and the control mechanism moves the valve member upward into sealing engagement with the downwardly facing valve seat.

12. The valve as defined in claim 11, wherein the plurality of springs comprise belleville washers.

13. The valve as defined in claim 11, further comprising:

a bridge member for interconnecting outer ends of the at least two pillars.

14. A valve as defined in claim 13, wherein the valve actuator is positioned opposite the valve body with respect to the bridge member.

15. The valve as defined in claim 14, wherein the valve actuator is a hydraulic motor and a gear box.

16. The valve as defined in claim 11, further comprising:

the valve member including serrations thereon for removing medium from at least one of the valve member and valve seat.

17. A valve, comprising:

a valve housing having a flow path and a valve seat therein;

a valve member moveable by rotation of a valve spindle between positions spaced from and seated on the valve seat;

at least two pillars affixed to the valve housing and extending outwardly therefrom, each pillar having a pillar axis parallel to a spindle axis;

a control mechanism for moving the valve spindle axially for engagement with the valve seat and, when the valve member is adjacent the valve seat, for rotating the valve spindle and valve member without axially moving the valve member, such that the valve member laps the valve seat to compensate for any variation of tolerance between the valve member and the valve seat resulting from buildup of medium or erosion;

the control mechanism including a collar for threaded engagement with the valve spindle and a plurality of belleville springs circumferentially surrounding end of each of the at least two pillars for enabling rotary movement of the spindle and valve member during axially movement of the collar with respect to the valve body;

a bridge member for interconnecting outer ends of the at least two pillars; and the valve actuator being positioned opposite the valve body with respect to the bridge member.

18. The valve as defined in claim 17, wherein the valve actuator is a hydraulic motor and a gear box.

19. The valve as defined in claim 18, wherein the valve actuator is a hydraulic motor and a gear box.

20. The valve as defined in claim 12, further comprising:

the valve seat in the valve housing being downwardly facing; and the control mechanism moves the valve member upward into sealing engagement with the downwardly facing valve seat.

* * * * *